C. A. LORY.
INTEGRATING WATER METER.
APPLICATION FILED JULY 24, 1916.

1,248,876.

Patented Dec. 4, 1917.
2 SHEETS—SHEET 2.

WITNESSES:
Myrtle Hinkle
Thelma Davis

INVENTOR.
CHARLES A LORY
BY Claude C. Coffin
ATTORNEY

UNITED STATES PATENT OFFICE.

CHARLES A. LORY, OF FORT COLLINS, COLORADO.

INTEGRATING WATER-METER.

1,248,876.  Specification of Letters Patent.  Patented Dec. 4, 1917.

Application filed July 24, 1916. Serial No. 110,870.

*To all whom it may concern:*

Be it known that I, CHARLES A. LORY, a citizen of the United States, residing at Fort Collins, in the county of Larimer, State of Colorado, have invented a new and useful Integrating Water-Meter, of which the following is a specification.

My invention relates to meters for measuring and recording the depth and flow of water in a rating flume or weir in a stream or a ditch and is adapted especially for use in irrigation ditches.

Objects of the invention are to provide a simple, accurate and inexpensive instrument to periodically measure the discharge or flow per unit of time through a ditch or stream and by integrating these measurements to obtain a direct meter reading showing substantially the total amount of water that has passed the point along the ditch or stream where the meter is located; also to provide simple means in conjunction with the direct reading meter to indicate and record the depth of water flowing in the stream. I attain these objects by a mechanism substantially as indicated in the accompanying drawings which form a part of this specification.

My meter is used in connection with a rating flume or weir in small canals or streams and permanent gaging stations in larger streams and rivers, where the rate of discharge is capable of calculation or determination from the depth of water passing the measuring station. The principle of the meter is to continuously indicate and record the depth of water flow by recording means controlled by the water level by a float in the water, and also, by an integrating counter carried by the float and driven by a time controlled irregular cylinder, to indicate on a direct reading dial the total volume of water that has passed the meter in the canal or stream.

Figure 1:
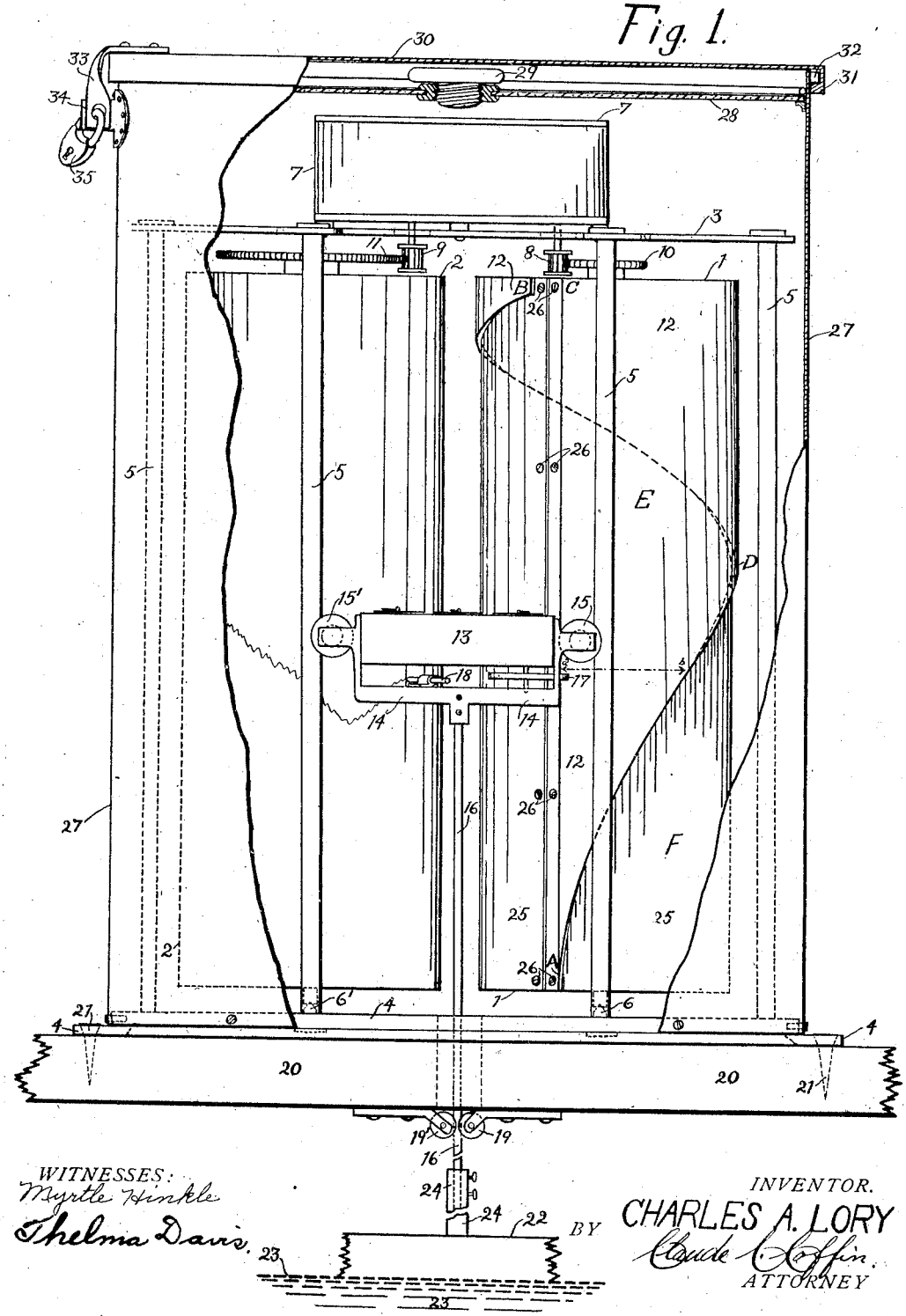
Figure 2:
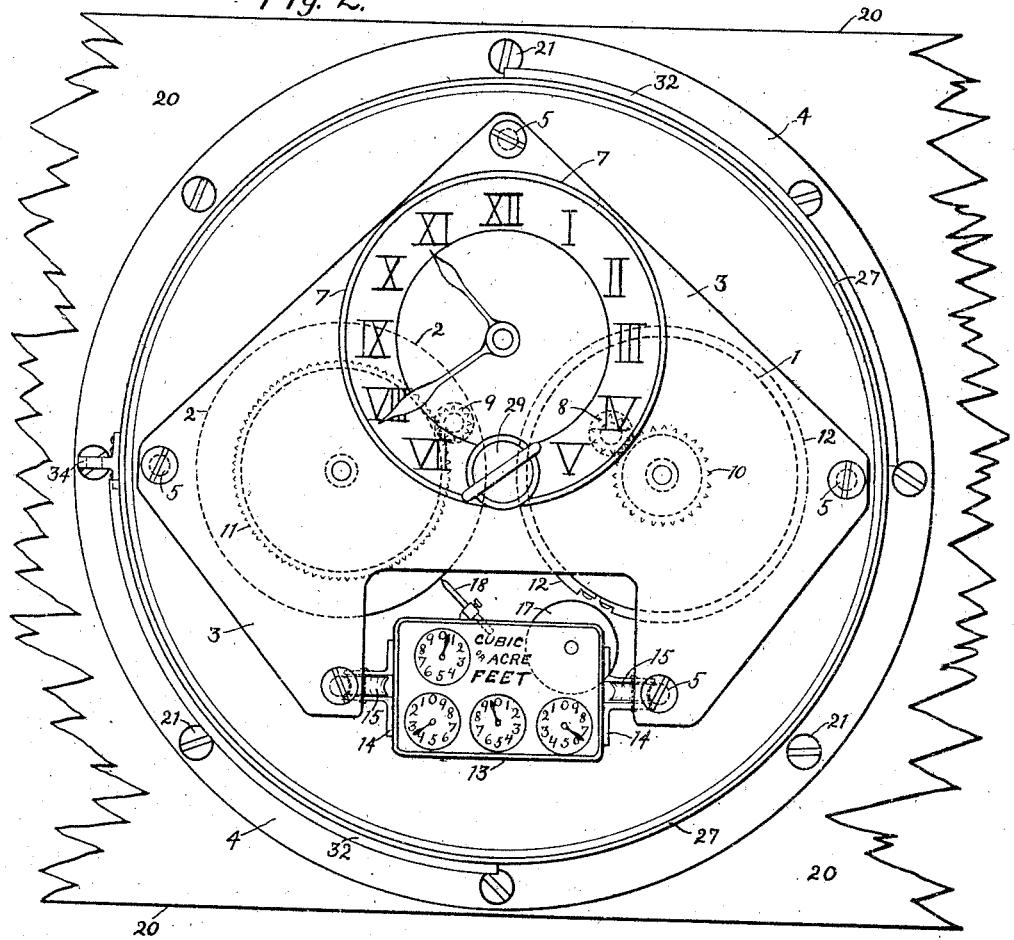
Figure 3:
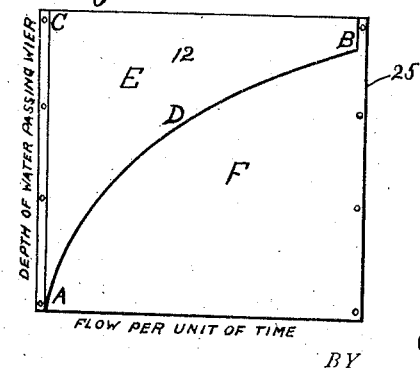

In the drawings, Figure 1 is a side view or elevation of the apparatus with a part of the inclosing casing broken away exposing the meter parts. Fig. 2 is a top view or plan of the meter with the top of the casing removed. Fig. 3 is a reduced diagrammatic view of the integrating cylinder covering surface unrolled, indicating the plotted curve of the mutilated cylinder surface.

In the several figures the same reference numerals and letters refer to the same or like parts.

1 and 2 are time controlled revoluble cylinders mounted vertically in a frame work consisting of a top plate 3 and base 4 and vertical posts 5. The cylinders are adapted to rest and revolve on jewel posts 6 and 6' on the base plate 4 and have suitable bearings in the plate 3 at the top.

7 is a spring motor clock anchored to plate 3 with its time reading face turned up. 8 and 9 are pendant gears of the clock work extending through the base of the clock and through plate 3 and adapted to rotate the cylinders 1 and 2 through gears 10 and 11, respectively. Gears 10 and 11 are anchored, respectively, to the cylinders 1 and 2, either rigidly or by resilient spring connections as may be desired.

Pendant gear 9 is connected in the clock gear train so as to rotate slowly and continuously and rotate the recording cylinder 2 at a predetermined slow speed, as for example one revolution in twelve hours. Gear 8 is driven intermittently by the clock work in a manner to rotate integrating cylinder 1 one complete revolution at predetermined intervals, for example once every hour or half hour or at shorter intervals if desired. Cylinder 1 stands at rest in the position shown except at the predetermined intervals when it is rapidly rotated one revolution by the gear 8. The intermittent driving of the gear 8 in the clock work may be accomplished in any obvious manner. A simple construction of clock work to accomplish this may be to provide usual striking mechanism with a strike control ratchet with uniform spacing, the gear 8 being driven by the striking gear train and so timed that at each predetermined strike interval the cylinder 1 will be rotated one complete revolution.

The particular form of clock motor is immaterial to this invention and is not here shown or described in greater particularity. It is understood that clock 7 is so constructed that cylinder 2 is slowly rotated constantly and cylinder 1 is rapidly turned one revolution at predetermined intervals.

12 is a raised portion of the mutilated covering or surface on cylinder 1 while 25 indicates the remaining cut-away portion of the cylinder cover, forming two irregular surfaces E and F of different diameters, the diameter of cylindrical surface E being the greater.

13 is a calibrated counter with direct reading dial on its upper face. Counter 13 is supported in a float-controlled carriage 14 which is carried upon a stem 16 of a float 22 in the water under the meter in the ditch or stream. 15 and 15' are guide rollers at the sides of carriage 14 adapted to engage upon two posts 5 and guide the carriage and hold it in proper relative position to the cylinders 1 and 2.

16 is a connecting rod or stem fastened to carriage 14 and passing down through the base of the meter and adjustably connected with the float 22, as hereinafter explained.

17 is a fiber or other suitable roller drive wheel of counter 13 extending out from the counter and the carriage and adapted to engage upon and be driven by the raised portion 12 or mutilated surface E of the integrating cylinder 1 when that cylinder rotates. The rest position of cylinder 1 is as shown so wheel 17 does not rest on the raised surface; this allows of free vertical movement of the carriage 14 by the float to exactly equal the rise or fall of the water level in the stream.

18 is a suitable marker carried upon the carriage 14 and adapted to mark upon the surface of the recording cylinder 2, thus constantly recording the exact water level in the stream.

19 and 19' are suitable guide rollers fastened to the support for the meter and adapted to guide connecting rod or stem 16 and maintain it in position exactly parallel to the axes of the cylinders. 20 indicates a supporting plank or frame work upon which the meter is anchored, as by screws 21 through base plate 4.

22 indicates a float to be placed in the water (indicated at 23) above the weir or in the rating flume where the water is to be measured. The connecting rod 16 is adjustably fastened to float 22, as by a hollow sleeve 24.

27 is a suitable casing to inclose the meter parts and is shown as setting over the meter and anchored to base plate 4. 28 indicates a permanent heavy glass plate cover to the containing case, and may have a metal plug 29 for access to the clock without removing the plate. 30 is a removable cover with segmented flange 31 adapted to draw under projections 32 at the sides of the casing by revolving the cover. A leaf 33 projecting from cover 30 may be locked to a stud 34 on the casing by lock 35 to prevent unauthorized tampering with the mechanism.

The mutilated raised surface E on the cylinder 1 is such that the horizontal distance from the straight edge A—C to the curved edge A—D—B at a given altitude on the cylinder is exactly proportional to the flow of water passing over the weir or through the rating flume when the depth of water over the weir sill or in the flume or stream, as the case may be, is equal to that altitude. It will be apparent that the curve A—D—B and resulting shape of mutilated surface E will be dependent upon the kind and size of weir or rating flume in connection with which the meter is to be used and must be constructed for a particular weir or flume.

In order that the meter may be used in connection with different sizes and kinds of weirs or flumes or rating stations, a removable surface cover may be provided for the cylinder 1. This is shown in the drawings at 12 and 25, 12 being a thick portion of the cover to form the mutilated raised surface E, and 25 being a thinner part of the cover to form the cut-away surface F. This removable surface may be fastened in place by set screws 26. An integrating surface cover may thus be made for a particular size or kind of weir and this cover placed on a standard form of meter.

The curve A—D—B is plotted for a particular size and kind of weir or flume, for example a particular size of Cippoletti trapezoidal weir. The ordinates of the curve are the actual depth of water over the sill of the weir and the corresponding abscissas are proportional to the volume of flow of water at the several depths. The volume of flow at different depths is either computed by well known theoretical weir formulæ or determined empirically by experiment.

Thus, when the cover or surface to the integrating cylinder 1 is in place on the meter, the vertical distance along the straight edge A—C of mutilated surface E is the actual depth that the measured water may have over the sill of the weir, or in the rating flume, as the case may be. And at each depth of water or altitude on the line A—C the horizontal distance $a$—$b$ around the cylinder cover from the point at the altitude to the edge of the curve A—D—B will be proportional to the flow of water over the weir. Thus the driving of wheel 17 and counter 13 is directly proportional to the flow of water having depth equal to the altitude of wheel 17 on cylinder 1, and counter 13, being properly calibrated, gives a direct reading of the total flow in cubic feet or acre feet or other desired unit.

In adjusting the apparatus, rod 16 is so adjusted in sleeve 24 of the float that roller drive wheel 17 is at zero or the extreme lower end of curve A—D—B when the water level above the weir is just to the top of the weir sill without any flow passing the weir; or in a rating flume, when there is no water passing. At the same time marker 18 will contact at zero altitude on recording cylinder 2. As the water rises and flows over the weir the float will lift the carriage 14 and the marker 18 will indicate the exact depth of water on the recording cylinder. When the integrating cylinder 1 rotates at its predetermined intervals the rotation of roller drive wheel 17 will depend upon the distance $a$—$b$ across the mutilated raised surface E and will be in exact proportion to the rate of flow at that depth of water. Thus the driving of the counter will be exactly proportional to the discharge of water at the times cylinder 1 revolves.

The reading dial on the counter is calibrated on each instrument to read in cubic feet or other desired units or multiple, thus giving a substantially correct direct meter reading of the amount of flow that has passed the measuring point.

In practice it is usual to inclose float 22 in a well or protecting box connected by small apertures to the water in the ditch or stream to prevent injury to the apparatus or fluctuations from water disturbances. By integrating the curve thus permanently recorded on this chart, by use of a planimeter, for example, and multiplying by a proper constant for that instrument and weir or flume, the flow may, at any time, be determined with greater accuracy than from the direct reading on the counter. Thus, in practice, the direct reading feature is used as an immediate and ever ready indicator, while the permanent marked charts, taken from the recording cylinder, are preserved for permanent record from which accurate computation can be made if necessary.

Cylinder 2 may be covered with a removable calibrated paper chart, to receive the tracing of marker 18 and retain the same as permanent record.

The material used for the several parts should be rust proof so far as possible.

I claim:

1. In a water meter for use with a measuring weir or flume, the combination of a mutilated surface plotted with ordinate dimension equal to depths of water and abscissa dimension proportional to the corresponding rate of discharge, with an integrating counter movable parallel to the ordinate of said surface and controlled by the water level and adapted to intermittently measure and integrate the abscissas on said surface.

2. In a water meter for use with a measuring weir or flume, the combination of a member having a mutilated surface plotted with ordinate dimension equal to depths of water over the weir or in the flume and abscissa dimension proportional to the corresponding rate of discharge through the weir or flume, with an integrating counter movable parallel to the ordinate of said surface and controlled by the water level and in engaging relation with said surface, said mutilated surface member adapted to be moved intermittently so that said counter will register and integrate the abscissas of said surface.

3. In a water meter of the class described, the combination of an intermittently revoluble cylinder having a mutilated surface plotted according to the rating of a measuring weir or flume, the altitude or ordinate dimension on the surface being equal to the depth of water and the circumference or abscissa dimension being proportional to the corresponding discharge, an integrating counter controlled by the water level and movable parallel to the ordinate of said surface and mounted in engaging relation with said mutilated surface and adapted to be driven thereby as said cylinder rotates.

4. In a water meter adapted for use with a measuring weir or flume, the combination of a rotatable cylinder having a raised mutilated surface with straight edge parallel to the axis of the cylinder and the opposite edge a curve plotted with ordinates parallel to the cylinder axis and equal to depths of water over the weir or in the flume and abscissas on the circumference of the cylinder proportional to the corresponding discharge of water through the weir or flume, an integrating counter displaceable parallel to the axis of the cylinder and in engaging relation with said mutilated surface and controlled by the water level in the flume or weir and adapted to measure and integrate the abscissas of said curve by being driven by said mutilated surface as the cylinder rotates.

5. In a water meter for use with a measuring weir or flume, a vertically mounted rotatable cylinder having a mutilated surface with a raised portion plotted according to the rating of the weir or flume, the altitudes on the surface being equal to depths of water in the weir or flume and the horizontal circumferential distances across said surface being proportional to the corresponding rates of discharge of water through the weir or flume, a float adapted to rest upon the water in the weir or flume, a stem on said float, an integrating counter supported on said stem and adapted to be raised and lowered with said float and in engaging relation with said mutilated surface, a drive wheel on said counter adapted to be operated by engagement with said surface when the cylinder rotates.

6. In a water meter of the class described, a revoluble integrating cylinder and a revoluble recording cylinder mounted vertically side by side, means to rotate said cylinders, a float adapted to rest upon the water in a weir or flume beneath the meter, a stem extending upward from said float and supporting a carriage adapted to be raised and lowered with said float and near the surfaces of said cylinders, a counter on said carriage adapted to engage upon the surface of said integrating cylinder and a marker on said carriage adapted to trace upon said recording cylinder, substantially as described.

CHARLES A. LORY.

Witnesses:
 FRED G. PERSON,
 L. D. CRAIN.

Copies of this patent may be obtained for five cents each, by addressing the "Commissioner of Patents, Washington, D. C."